(12) United States Patent
Hall et al.

(10) Patent No.: US 8,237,584 B2
(45) Date of Patent: Aug. 7, 2012

(54) CHANGING COMMUNICATION PRIORITIES FOR DOWNHOLE LWD/MWD APPLICATIONS

(75) Inventors: David R. Hall, Provo, UT (US); Christopher Durrand, Pleasant Grove, UT (US); Brad Barger, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 695 days.

(21) Appl. No.: 12/362,586

(22) Filed: Jan. 30, 2009

(65) Prior Publication Data

US 2009/0267790 A1 Oct. 29, 2009

Related U.S. Application Data

(63) Continuation-in-part of application No. 12/109,211, filed on Apr. 24, 2008, now Pat. No. 8,061,443.

(51) Int. Cl.
*G01V 3/00* (2006.01)
*E21B 47/00* (2012.01)
*E21B 49/00* (2006.01)

(52) U.S. Cl. ............... 340/853.3; 340/854.9; 340/855.3; 367/76; 175/50

(58) Field of Classification Search .............. 175/40, 175/50; 324/333, 334, 338, 339, 345, 346; 340/853.3, 854.9, 855.3; 367/76
See application file for complete search history.

(56) References Cited

U.S. PATENT DOCUMENTS

| | | | |
|---|---|---|---|
| 2,000,716 A | 5/1935 | Polk | |
| 2,301,783 A | 11/1942 | Lee | |
| 2,414,719 A | 1/1947 | Cloud | |
| 3,253,245 A | 5/1966 | Brandt | |
| 3,967,201 A | 6/1976 | Rorden | |
| 4,012,092 A | 3/1977 | Godbey | |
| 4,039,237 A | 8/1977 | Cullen | |
| 4,176,894 A | 12/1979 | Godbey | |
| 4,389,706 A * | 6/1983 | Gomola et al. | 700/1 |
| 4,416,494 A | 11/1983 | Watkins | |
| 4,432,064 A * | 2/1984 | Barker et al. | 702/9 |
| 4,591,226 A | 5/1986 | Hargett | |
| 4,660,910 A | 4/1987 | Sharp | |
| 4,785,247 A | 11/1988 | Meador | |
| 4,806,928 A | 2/1989 | Vereruso | |
| 5,337,002 A | 8/1994 | Mercer | |
| 6,223,826 B1 | 5/2001 | Chau | |
| 6,367,564 B1 | 4/2002 | Mills | |
| 6,392,317 B1 | 5/2002 | Hall | |
| 6,402,524 B2 | 6/2002 | Wurm | |
| 6,446,728 B2 | 9/2002 | Chau | |
| 6,651,755 B1 | 11/2003 | Kelpe | |
| 6,655,464 B2 | 12/2003 | Chau | |
| 6,670,880 B1 | 12/2003 | Hall | |
| 6,717,501 B2 | 4/2004 | Hall | |
| 6,739,413 B2 | 5/2004 | Sharp | |
| 6,799,632 B2 | 10/2004 | Hall | |
| 6,821,147 B1 | 11/2004 | Hall | |
| 6,830,467 B2 | 12/2004 | Hall | |

(Continued)

*Primary Examiner* — Shane Bomar
*Assistant Examiner* — Catherine Loikith
(74) *Attorney, Agent, or Firm* — Brinks Hofer Gilson & Lione

(57) ABSTRACT

In one aspect of the present invention, a method for tool string communication comprises the steps of providing a downhole tool string with at least two downhole LWD/MWD instruments in electrical communication with a downhole telemetry system. The instruments are capable of generating at least one data packet assigned a priority. The tool string is deployed in a wellbore and then the priority of the data packet is changed.

20 Claims, 10 Drawing Sheets

U.S. PATENT DOCUMENTS

| Patent | Date | Name | | Ref |
|---|---|---|---|---|
| 6,844,498 B2 | 1/2005 | Hall | | |
| 6,845,822 B2 | 1/2005 | Chau | | |
| 6,888,473 B1 | 5/2005 | Hall | | |
| 6,913,093 B2 | 7/2005 | Hall | | |
| 6,929,493 B2 | 8/2005 | Hall | | |
| 6,945,802 B2 | 9/2005 | Hall | | |
| 6,968,611 B2 | 11/2005 | Hall | | |
| 7,028,779 B2 | 4/2006 | Chau | | |
| 7,139,218 B2 * | 11/2006 | Hall et al. | | 367/82 |
| 7,150,329 B2 | 12/2006 | Chau | | |
| 7,453,768 B2 * | 11/2008 | Hall et al. | | 367/82 |
| 2004/0104797 A1 | 6/2004 | Hall | | |
| 2004/0113808 A1 | 6/2004 | Hall | | |
| 2004/0145492 A1 | 7/2004 | Hall | | |
| 2004/0150532 A1 | 8/2004 | Hall | | |
| 2004/0164833 A1 | 8/2004 | Hall | | |
| 2004/0164838 A1 | 8/2004 | Hall | | |
| 2004/0216847 A1 | 11/2004 | Hall | | |
| 2004/0244916 A1 | 12/2004 | Hall | | |
| 2004/0244964 A1 | 12/2004 | Hall | | |
| 2004/0246142 A1 | 12/2004 | Hall | | |
| 2005/0001735 A1 | 1/2005 | Hall | | |
| 2005/0001736 A1 | 1/2005 | Hall | | |
| 2005/0001738 A1 | 1/2005 | Hall | | |
| 2005/0035874 A1 | 2/2005 | Hall | | |
| 2005/0035875 A1 | 2/2005 | Hall | | |
| 2005/0035876 A1 | 2/2005 | Hall | | |
| 2005/0036507 A1 | 2/2005 | Hall | | |
| 2005/0039912 A1 | 2/2005 | Hall | | |
| 2005/0045339 A1 | 3/2005 | Hall | | |
| 2005/0046586 A1 | 3/2005 | Hall | | |
| 2005/0046590 A1 | 3/2005 | Hall | | |
| 2005/0067159 A1 | 3/2005 | Hall | | |
| 2005/0070144 A1 | 3/2005 | Hall | | |
| 2005/0082092 A1 | 4/2005 | Hall | | |
| 2005/0092499 A1 | 5/2005 | Hall | | |
| 2005/0093296 A1 | 5/2005 | Hall | | |
| 2005/0095827 A1 | 5/2005 | Hall | | |
| 2005/0115717 A1 | 6/2005 | Hall | | |
| 2005/0145406 A1 | 7/2005 | Hall | | |
| 2005/0150653 A1 | 7/2005 | Hall | | |
| 2005/0161215 A1 | 7/2005 | Hall | | |
| 2005/0173128 A1 | 8/2005 | Hall | | |
| 2005/0212530 A1 | 9/2005 | Hall | | |
| 2005/0236160 A1 | 10/2005 | Hall | | |
| 2005/0284662 A1 | 12/2005 | Hall | | |
| 2006/0221768 A1 * | 10/2006 | Hall et al. | | 367/82 |
| 2007/0272442 A1 * | 11/2007 | Pastusek et al. | | 175/40 |

* cited by examiner

CHANGING COMMUNICATION PRIORITIES FOR DOWNHOLE LWD/MWD APPLICATIONS

CROSS REFERENCE TO RELATED APPLICATIONS

This application is a continuation in-part of U.S. patent application Ser. No. 12/109,211 filed on Apr. 24, 2008, which is now U.S. Pat. No. 8,061,443 issued on Nov. 22, 2011, and entitled Downhole Sample Rate System. This application is herein incorporated by reference for all that it discloses.

BACKGROUND

Knowledge of downhole parameters and conditions help drillers make decisions that may increase drilling efficiency and save money. Downhole data acquisition systems may be used by drillers to determine those parameters, such as spatial position, formation type, and the economic potential of a resource. Often, bottom hole assemblies (BHA) will contain sensors that can measure various rock and drilling properties employing acoustic, nuclear, electromagnetic, and other sensing and data acquisition capabilities. At different points in a drilling operation, data from certain sensors may be of a higher interest then data from other sensors.

U.S. Pat. No. 5,959,547 to Tubel et al., which is herein incorporated by reference for all that it contains, discloses a plurality of downhole control systems interconnected by a network including a server for monitoring and controlling network communications. Each downhole control system is associated with a zone in one or more wells. The downhole control systems communicate directly with each other transferring information and commands as necessary. The downhole server monitors network communications to resolve data collisions and provides supervisory functions.

U.S. Pat. No. 6,909,667 to Shah et al., which is herein incorporated by reference for all that it contains, discloses several methods for selecting and transmitting information from downhole source using more than one channel of communication wherein data streams transmitted over each communications channel are each independently interpretable without reference to data provided over the other of the communications channels. Preferred embodiments incorporate the use of a combination of at least two of mud-based telemetry, tubular-based telemetry, and electromagnetic telemetry to achieve improved results and take advantage of opportunities presented by the differences between the different channels of communication.

U.S. Pat. No. 7,142,129 to Hall et al., which is herein incorporated by reference for all that it contains, discloses, a method and system for use in synchronizing at least two clocks in a downhole network. The method comprises determining a total signal latency between a controlling processing element and at least one downhole processing element in a downhole network and sending a synchronizing time over the downhole network to the at least one downhole processing element adjusted for the signal latency. Electronic time stamps may be used to measure latency between processing elements. The system for electrically synchronizing at least two clocks connected to a downhole network comprises a controlling processing element connected to a synchronizing clock in communication over a downhole network with at least one downhole processing element comprising at least one downhole clock. Preferably, the downhole network is integrated into a downhole tool string.

BRIEF SUMMARY

In one aspect of the present invention, a method for tool string communication comprises providing a downhole tool string with at least two downhole Logging While Drilling (LWD)/Monitoring While Drilling (MWD) instruments in electrical communication with a downhole telemetry system. The instruments are capable of generating at least one data packet assigned a priority and tool string is deployed in a well bore. The priority of the data packet is then changed.

The priority may be changed at the point of creation by activating or deactivating the instruments. The priority may also be changed by adjusting a preamble before the data in a communication packet. The priority may be changed by adjusting the channel in which the data is sent. The priority may be changed by adjusting the order in which data is sent. Multiple data packets may have the same priority. Data packets may each have a unique priority. Data packets may have either a high priority or a low priority.

The priority may be changed remotely or onsite by either a computer or a human user. The priority may also be changed by a downhole instrument, such as a downhole processing unit. Data packets of a lower priority may be filtered out by a downhole processing unit. Data packets of a lower priority may be stored within the tool downhole for later transmission or sent up in unused or latent transmission time and stored uphole for later use. Data packets of a lower priority may be erased downhole. The priority may be automatically changed when the instruments sense that a downhole condition deviates from a pre-determined threshold window. Priority may also include the need to take more measurements per unit time or per unit distance from a first tool in preference to taking measurements from a second or a third tool. The priority may be changed in real-time or near real-time. The priority may be changed in response to a change in downhole geology, particular downhole drilling condition; some downhole or uphole activity or condition, response to results from some processed or interpreted data or change in desired outcome or goal.

For the purposes of this disclosure, the terms LWD and MWD refers to "logging-while-drilling" and "measurements-while-drilling" respectively. These terms refer to measuring the physical properties of formation and/or well bore, conditions of the well bore and/or drilling tools or combinations thereof, while advancing the drill string in the well bore, shortly there after, or while the drill string is still deployed in the well bore.

DETAILED DESCRIPTION

Figure 1:
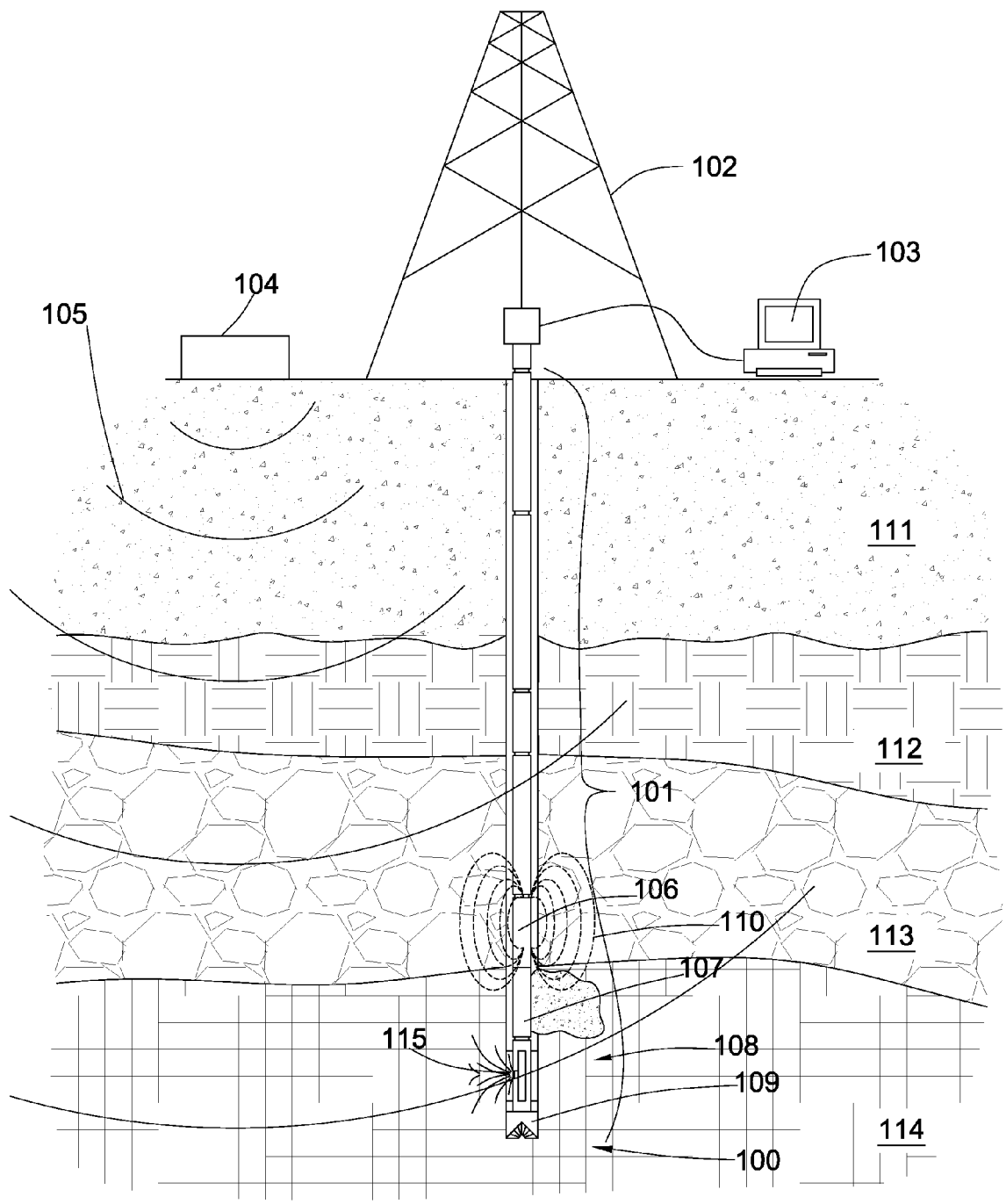
FIG. 1 is a cross-sectional diagram of an embodiment of a downhole tool string.

Referring now to FIG. 1, a downhole tool string 101 may be suspended by a derrick 102. The downhole tool string 101 may comprise one or more downhole components 100, linked together in the downhole tool string 101 and in communication with surface equipment 103 through a downhole telemetry system. Some telemetry systems may enable high-speed communication between devices connected to the downhole tool string 101, and may facilitate the transmission of data between sensors and sources. The data gathered by the downhole components 100 may be processed downhole, may be transmitted to the surface for processing, may be filtered downhole and then transmitted to the surface for processing, may be compressed downhole and then transmitted to the surface for processing, or combinations thereof. As an example, the downhole components 100 may include resistivity tools 106, seismic tools 104, 115, nuclear tools 107, thermometers, pressure sensors, rheology sensors, acoustic sensors, chemical sensors, calipers, formation hardness sensors, strain gauges, vibration sensors, pressure sensors, tool diagnostic sensors, electrical potential sensors, RPM sensors, WOB sensors, drill string stability sensors, fatigue sensors, and annular pressure sensors.

As the downhole tool string 101 advances, different rock formations 111, 112, 113, 114 may be encountered. Changes in formation type and depth give cause to change the dynamic conditions of the drill string as well as a level of interest an observer may address to sensor information from certain intervals or formation types. Reaching a drilling target, reaching a formation of interest, or encountering a particular drilling condition may result in a shift in drilling goals as determined by surface operator or even a departure from pre-drill plans. Thus a priority assigned to data packets generated by certain sensors may need to be adjusted to best meet the needs of the downhole or uphole situation. Different sensor readings may be of higher interest based upon the formation geology proximate the drill bit 109 or those sensor readings that may best describe the current BHA location, situation, and condition mitigation.

Figure 2:
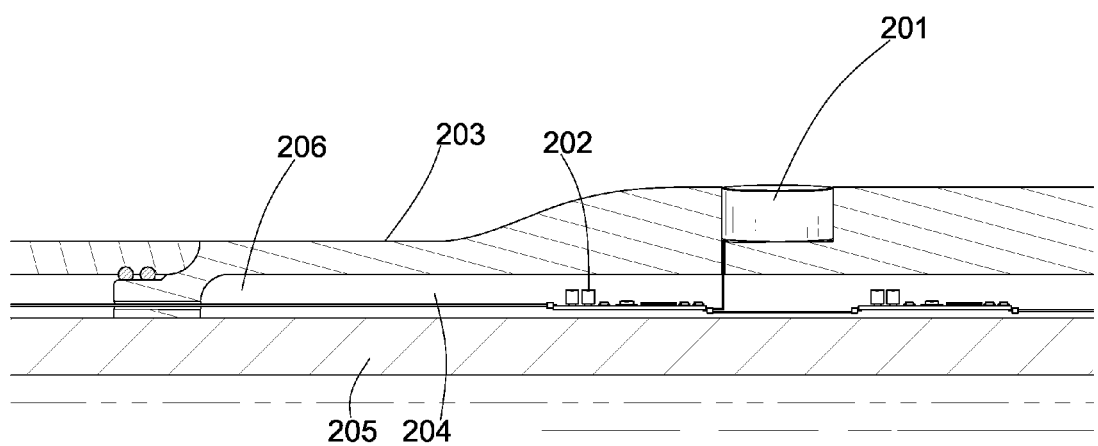
FIG. 2 is a cross-sectional diagram of an embodiment of tool string component.

FIG. 2 depicts a cross-sectional diagram of an embodiment of a sensor 201 in communication with a processing unit 202. The processing unit 202 is in communication with a downhole telemetry system 206. A preferred downhole telemetry system is disclosed in U.S. Pat. No. 6,670,880 to Hall, which is herein incorporated by reference for all that it discloses. In the embodiment of FIG. 2, the sensor 201 is disposed within a sleeve 203 that encases a drill pipe mandrel 205. A pocket 204 exists between the sleeve 203 and the mandrel 205. The pocket 204 may contain processing units, telemetry devices, or other necessary components. The processing unit 202 may perform data analysis functions and communication functions. The processing unit 202 may change the priority of data packets from certain sensors based upon its analysis. The processing unit 202 may change the priority of data packets from certain sensors based upon commands received from an up-hole computer.

Figure 3:
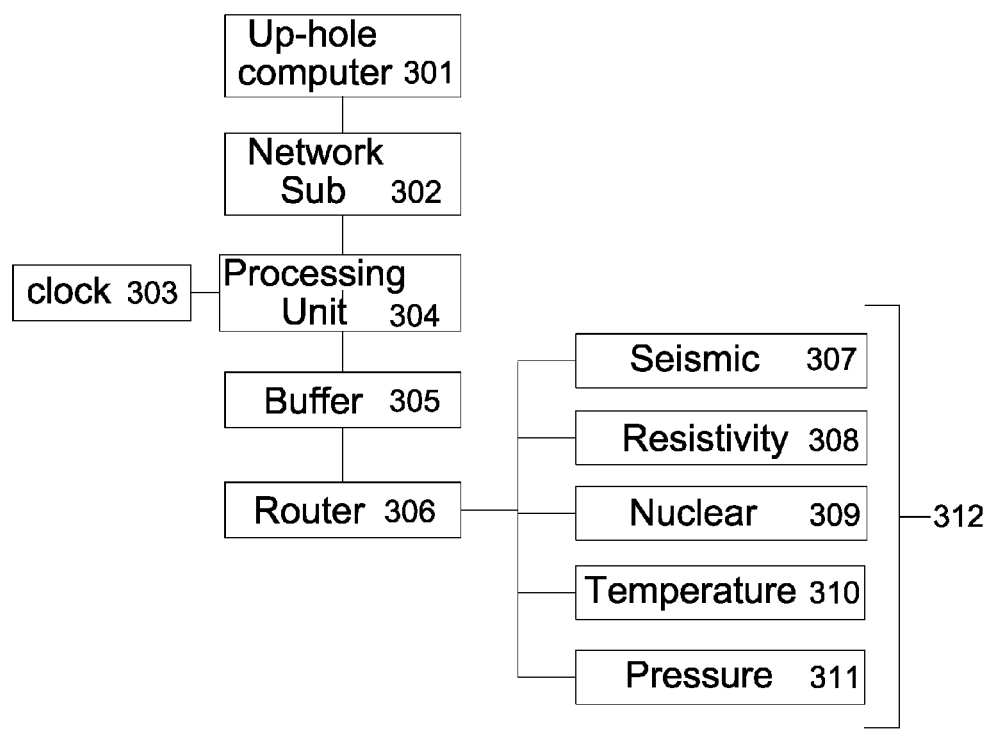
FIG. 3 is a block diagram of sensors in communication with an up-hole computer.

FIG. 3 is a block diagram depicting an embodiment of a downhole telemetry system in communication with sensors 312. In the depicted embodiment, an acoustic sensor 307, a resistivity sensor 308, a nuclear sensor 309, a temperature sensor 310, and a pressure sensor 311 are all connected to a router 306. The depicted case should not be considered a limiting case, in as much as a variety of sensors 312 or tools may be connected to the router 306. The router 306 serves the function of facilitating communication between a plurality of sensors and a processing unit 304. In some embodiments the router 306 may be a multiplexer.

The router 306 is in communication with a buffer 305. The buffer 305 provides memory for data packets to reside in while they wait for processing. The buffer 305 may be first in first out (FIFO) memory. The buffer 305 is in communication with the processing unit 304. The processing unit 304 may perform a variety of functions. The processing unit may perform preliminary analysis on the data packets that it receives. The processing unit may perform prioritizing functions on the data packets. Analysis may lead the processing unit 304 to increase or decrease the sample rate of certain sensors 312 based upon the priority assigned to the data packets generated by those certain sensors 312. A clock 303 is in communication with the processor 304. This clock 303 may be synchronized with an up-hole clock. The prioritizing functions may be determined by communications from up-hole users or computer. The prioritizing functions may be determined by the processing unit 304 analyzing the data packets.

Prioritizing functions may be implemented in a variety of ways including but not limited to those discussed in this disclosure. The processing unit 304 may send data packets from certain sensors 312 of higher priority more frequently than those of lower priority, or the processing unit 304 may decide to ignore lower priority data packets and only send higher priority data packets. Either of these methods may be implemented by deleting or filtering out all lower priority signals, by turning off the sensors 312 that are generating the lower priority data packets, or by storing the lower priority data packets downhole and sending them later. Turning certain sensors 312 off that are generating lower priority data packets may have the added benefits of reducing power usage at desired times, or during delays in drilling, or for time delay sampling.

The processing unit 304 is in communication with a network sub 302. The network sub 302 may contain signal amplifiers. A plurality of network subs 302 may exist within the same drill string. More than one network sub may be in communication with sensors 312 or tools. The network sub is in communication with an up-hole computer 301. The up-hole computer 301 may be operated by a human user or it may be automatic. The up-hole computer 301 may be remote.

Figure 4:
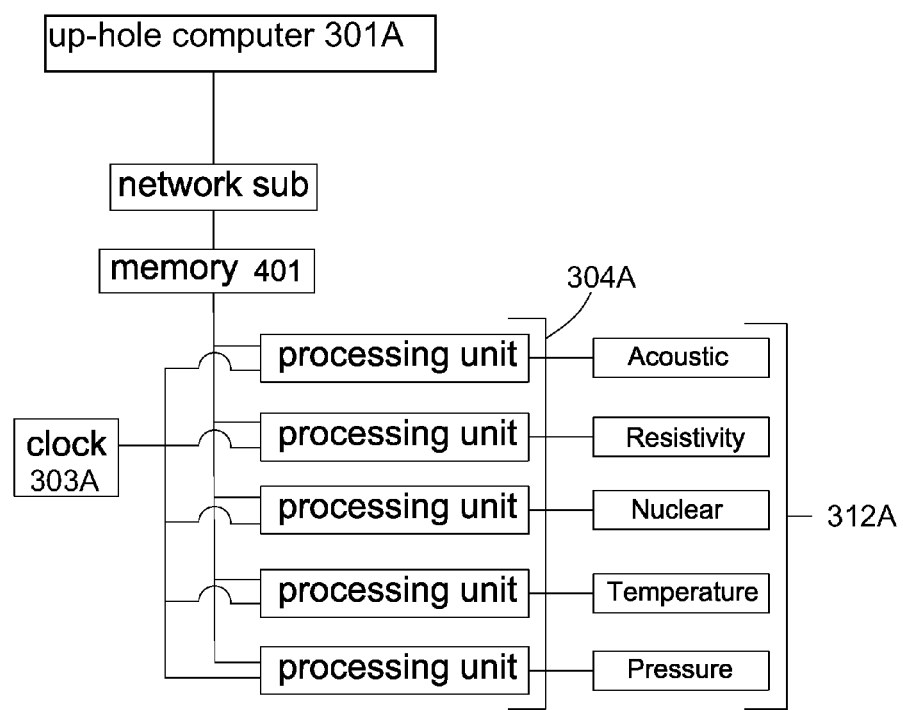
FIG. 4 is another block diagram of sensors in communication with an up-hole computer.

FIG. 4 is a block diagram depicting another embodiment of a downhole telemetry system in communication with sensors 312A. In this embodiment each sensor 312A is in communication with a unique processing unit 304A. The processing units 304A in this embodiment may perform data packet analysis and priority functions on the data packets that they each receive. The data packets' priority in this embodiment would predominantly be determined by an up-hole computer 301A or human user. The up-hole computer 301A may assign each unique processing unit 304A a priority to assign its data packets. The up-hole computer A or human user could adjust priority assignments sent to each unique processing unit 312A based on need. In this embodiment each processing unit 304A may be able to perform priority operations on the data packets that it receives. The processing units 304A may be programmed to test for certain thresholds. Once a sensor 312A reading reaches a predetermined threshold the sensor's 312A accompanying processing unit 304A may be able to automatically adjust the priority of the data packet. The adjusted priority may influence the sampling rate of certain sensors 312A at the expense of others, depending on available bandwidth. The processing units 304A may have a clock 303A in common. The clock 303A may be synchronized with an up-hole clock as previously disclosed. The processing units 304A may all be in communication with a single memory unit 401. The memory unit 401 may be accessible by each individual processing unit 304A. Each processing unit 304A may be able to manage the single memory unit 401 appropriately to ensure that the data packets are transmitted in the correct manner based on priority.

Figure 5A:
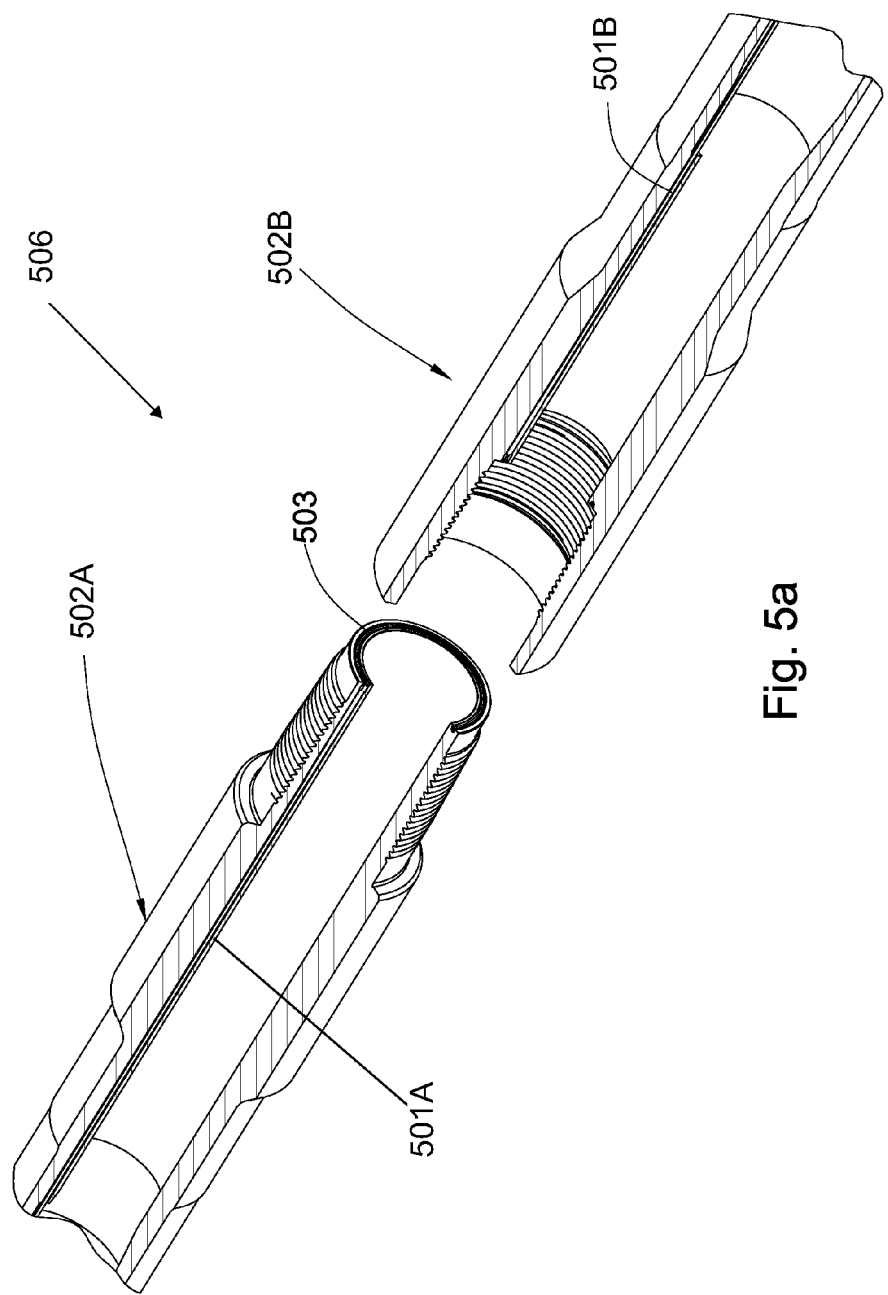
FIG. 5a is a cross-sectional diagram of a downhole telemetry system.
Figure 5B:
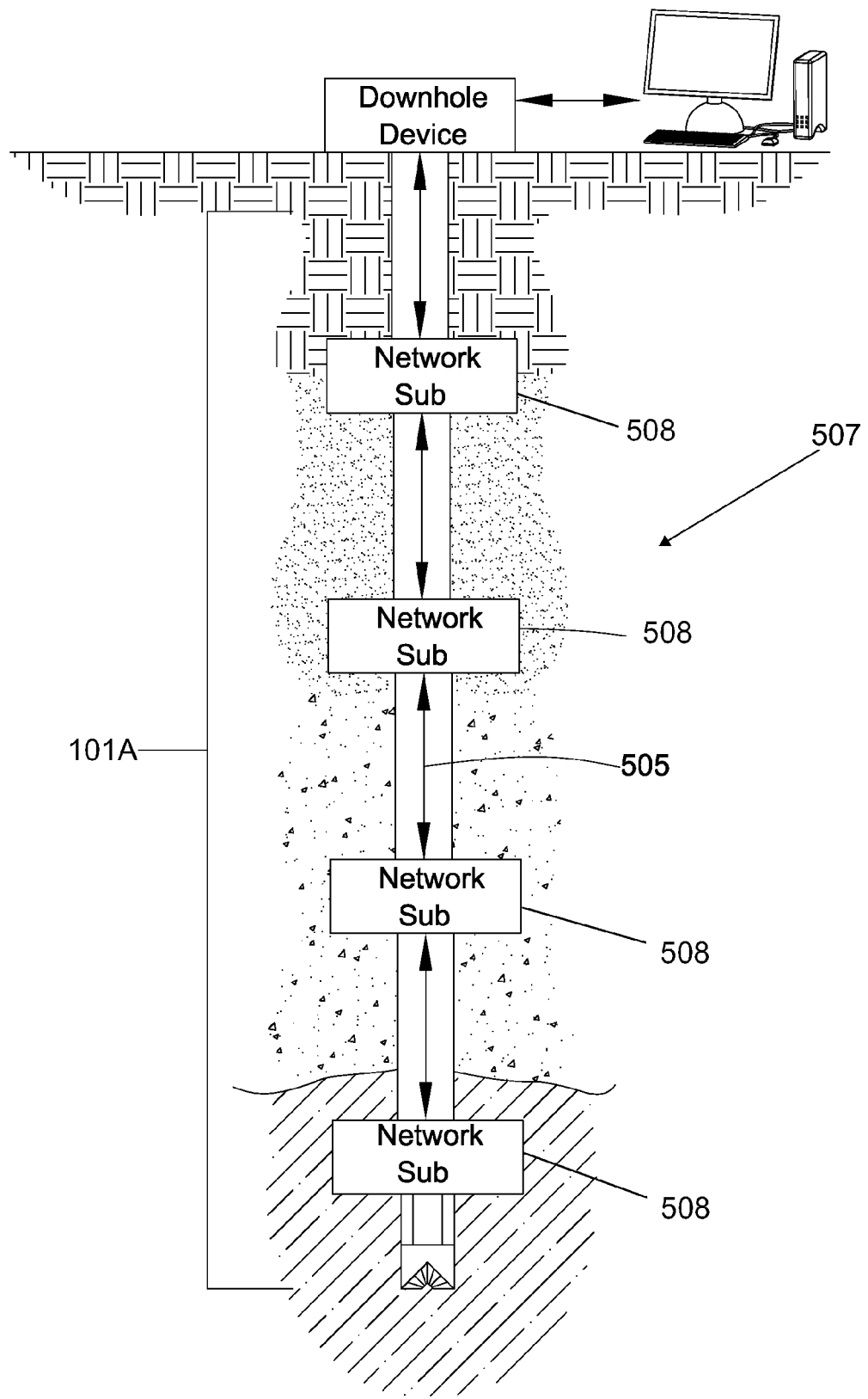
FIG. 5b is a block diagram of a downhole telemetry system.

FIG. 5a is a diagram of embodiments of a downhole components. In the depicted embodiment, communication cables 501A, 501B runs the length of each drill pipe 502A, 502B, respectively. The communication cable 501A is connected to at least one inductive coupler 503 at both ends of pipe 502A. The data signals transmitted on the communication cable 501A generate a magnetic field which transfers the data signal to a corresponding magnetic ring (not shown) in an adjacent drill pipe 502B. This process repeats throughout the drill string 101A. FIG. 5b is a block diagram depicting an embodiment of a downhole telemetry system 507. Using the components described in FIG. 5a, the data signals may require amplification along the drill string 101A. This amplification may take place within network subs 508 that are part of the drill string 101A. The network subs 508 may occur at every pipe length or may occur periodically after several pipe lengths.

Figure 6:
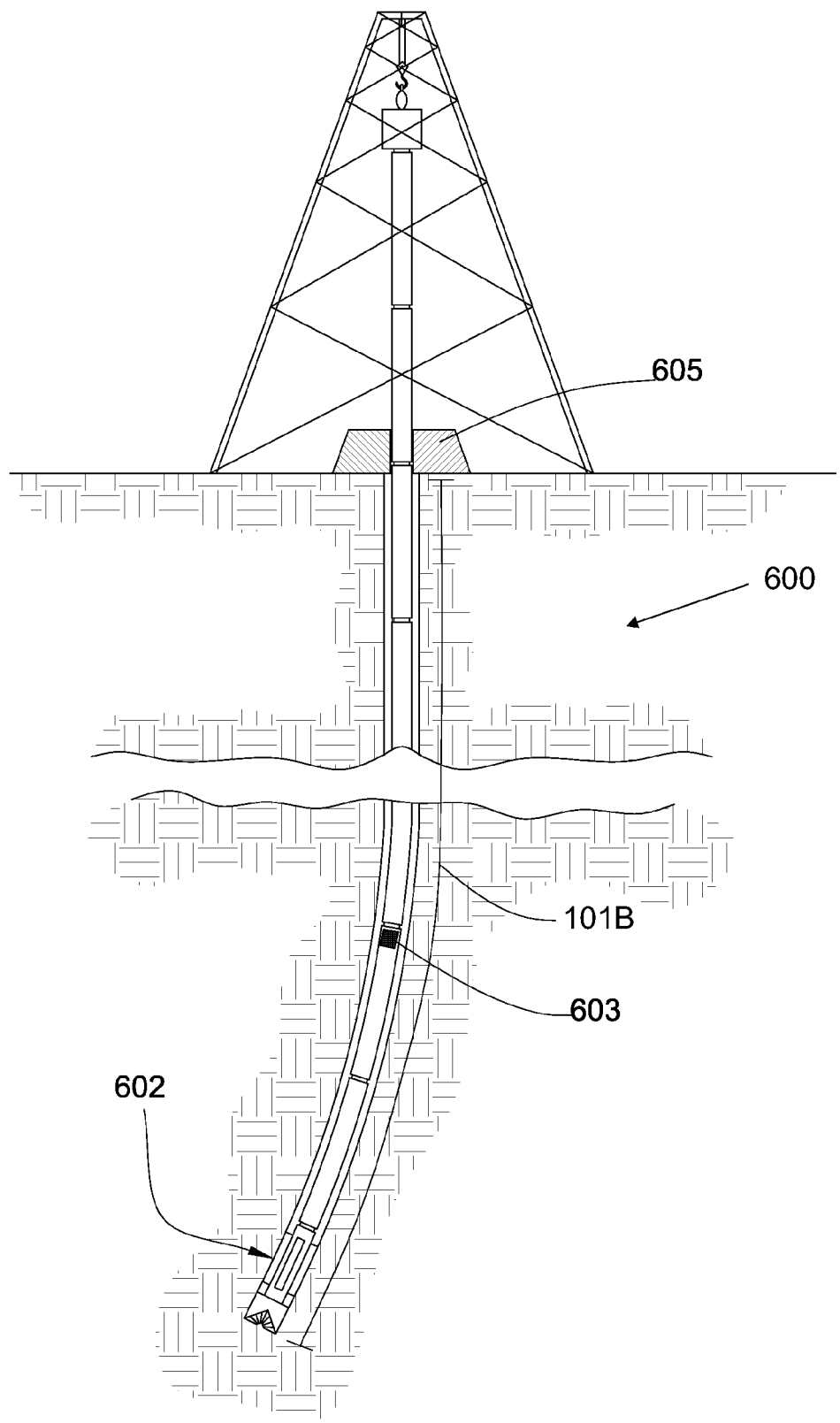
FIG. 6 is a cross-sectional diagram of a mud pulse system.

FIG. 6 is a diagram of an embodiment of a mud pulse telemetry system 600. The drill string 101B contains a mud pulse generator 603. These are both in communication with on up-hole mud pulse unit 605. The up-hole mud pulse unit 605 is able to receive data from and communicate commands to downhole tools 602. The mud pulse generator 603 may be in communication with downhole processing units. The downhole processing units control the downhole sensors and downhole tools 602. In this embodiment commands may be sent through mud pulses to adjust the priority of the data packets that are being sent. The priorities could also be adjusted by the downhole processing units.

Figure 7A:
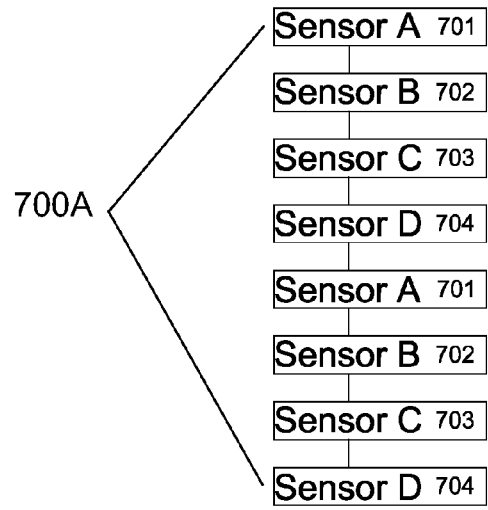
FIG. 7a is a block diagram depicting a priority communication sequence.
Figure 7B:
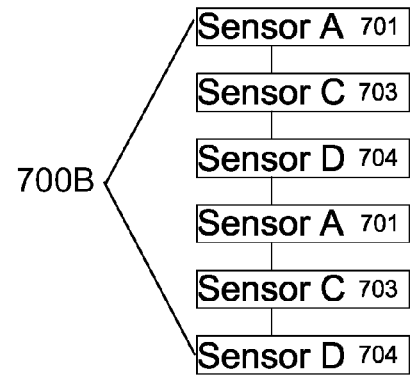
FIG. 7b is another block diagram depicting a priority communication sequence.

FIG. 7a and FIG. 7b are diagrams depicting an embodiment of a priority operation. FIG. 7a depicts a data stream of a sequence of data packets 700A. The data packets 700A are each associated with a sensor that generated them. Sensor A generates packet 701, sensor B generates packet 702, sensor C generates packet 703, and sensor D generates packet 704 respectively. In this embodiment, the data packets 700A may all have the same priority such that they are being transmitted in the order they were received by a downhole processing unit. The data packets 700A in this embodiment may also have unique priorities wherein the data packets 700A are transmitted in order of priority. FIG. 7b depicts the sequence of data packets 700A from FIG. 7a after a priority was changed resulting in an altered sequence of data packets 700B. In this embodiment, the data packets 702 generated by sensor B were adjusted to a lower priority. The lower priority is manifested by data from sensor B no longer being sent. This could be implemented by turning sensor B off, by erasing the data from sensor B by saving the data from sensor B for later transmission, or by filtering out the data from sensor B.

Figure 7C:
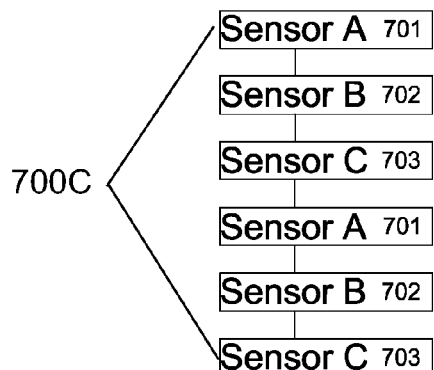
FIG. 7c is another block diagram depicting a priority communication sequence.
Figure 7D:
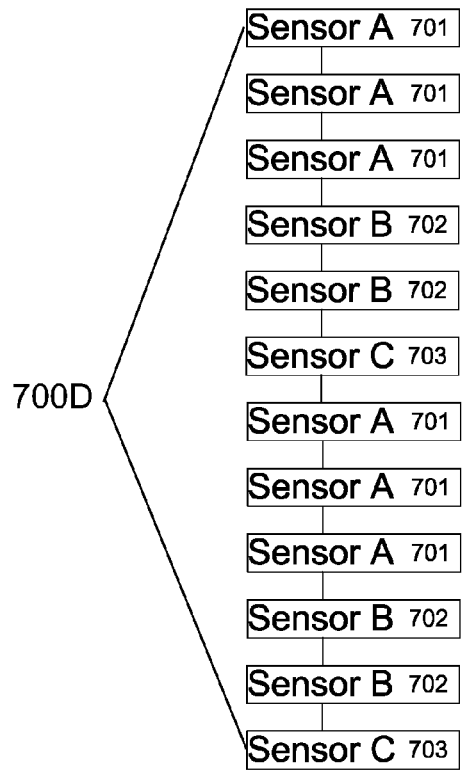
FIG. 7d is another block diagram depicting a priority communication sequence.

FIG. 7c and FIG. 7d are diagrams depicting another embodiment of a priority operation. FIG. 7c depicts a data stream of a sequence of data packets 700C. The data packets 700C are each associated with a sensor that generated them. Sensor A generates packet 701, sensor B generates packet 702, and sensor C generates packet 703 respectively. In this embodiment, all of the data packets 700C in FIG. 7c may have the same priority. FIG. 7d depicts the sequence of data packets 700C of FIG. 7c after some data packet priorities are adjusted resulting in an altered sequence of data packets 700D. The change in data packet priority is manifest through a change in sample rate. In the embodiment depicted in FIG. 7d, packet 702 generated by sensor B has a higher priority than packet 703 generated by sensor C, which is implemented by sampling sensor B twice as often as sensor C. In this embodiment, packet 701 from sensor A has a higher priority than packet 702 from sensor B, and packet 703 from sensor C. This is implemented by sampling sensor A three times as often as sensor C and one and a half times as often as sensor B.

Figure 8A:
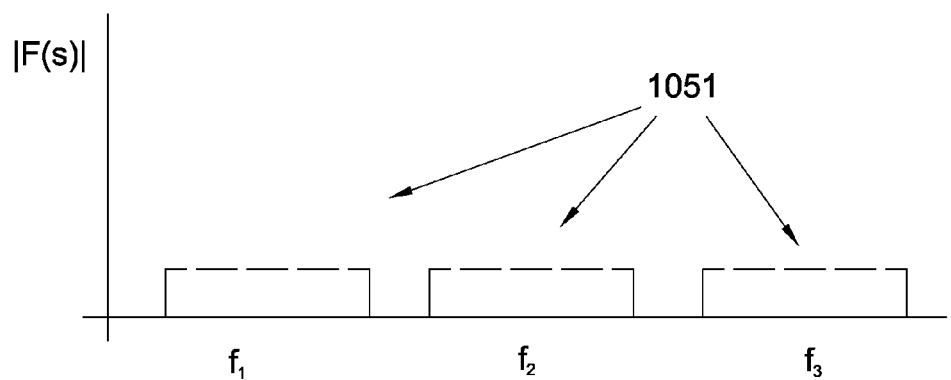
FIG. 8a is a plot depicting a communication priority system.
Figure 8B:
FIG. 8b is a depiction of a data packet.

FIG. 8a and FIG. 8b depict embodiments of data packets 1050. In FIG. 8a, the data packets 1050 are sent at different frequencies. Data packet priority is determined by the frequency channel 1051 that the packet is sent in. In this embodiment, three channels 1051 are depicted. In FIG. 8b, a data packet 1050 is depicted with a preamble 1052. In this embodiment the data packet priority is determined by information stored in the preamble 1052. In both of these embodiments, the data packet priority could be adjusted by either changing the frequency channel that the data packet is in or by adjusting the information stored in the preamble 1052.

Figure 9:
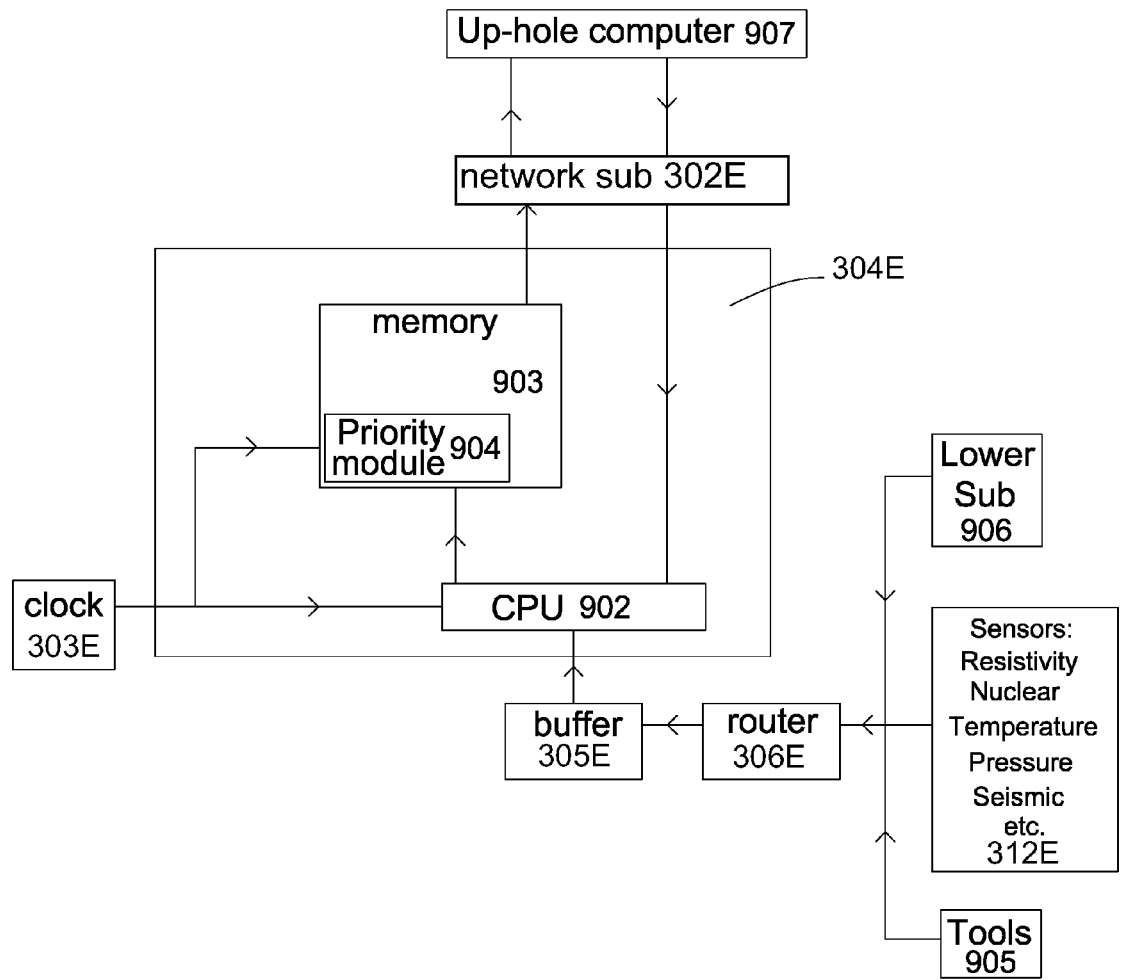
FIG. 9 is another block diagram of sensors in communication with an up-hole computer.

FIG. 9 is a block diagram depicting an embodiment of a downhole telemetry system in communication with a processing unit 304E. In this embodiment, the processing unit 304E comprises a central processing unit (CPU) 902 and a memory component 903 with a priority module 904. In other embodiment, the processing unit 304E may comprise a field-programmable gate array (FPGA). The processing unit 304E is in communication with a clock 303E. The clock 303E may be synchronized with a clock from an up-hole computer 907. The processing unit 304E is in communication with a network sub 302E. The network sub 302E may comprise amplifiers. A drill string may comprise a plurality of network subs 302E spaced periodically along the distance of the drill string. The processing unit 304E is in communication with a buffer 305E which stores data packets waiting processing. The buffer 305E is in communication with a router 306E. The router 306E serves the function of facilitating communication between a plurality of instruments and the processing unit 304E. The router 306E may be in communication with sensors 312E, a lower sub 906, or various drill string tools 905.

The processing unit 304E may analyze data packets that it is receiving. The CPU 902 may function as a data analyzer, priority assigner, or priority adjuster. The CPU 902 in analyzing data packets from lower subs 906 and also from its sensors 312E may adjust the priority of various data packets. The CPU 906 may receive commands from the up-hole computer 907 to adjust data packet priorities. The CPU 902 transmits data to a memory component 903. The memory component 903 acts as a queue, storing data packets waiting to be transmitted to the next sub 302E. The memory component 903 includes a priority module 904. The priority module 904 maintains the queue in order of data packet priority. The priority module 904 may have the abilities to erase data packets or to move data packets to another place in the queue.

Whereas the present invention has been described in particular relation to the drawings attached hereto, it should be understood that other and further modifications apart from those shown or suggested herein, may be made within the scope and spirit of the present invention.

What is claimed is:

1. A method for communicating with a downhole instrument in a tool string having a first instrument and a second instrument, and a network sub, the method comprising the steps of:
    generating a first data packet associated with the first instrument;
    assigning a first priority to the first data packet;
    generating a second data packet associated with the second instrument;
    assigning a second priority to the second data packet;
    assembling a first sequence of data packets based on the first priority and the second priority;
    sequentially transmitting the first sequence of data packets to a network sub;
    testing the first data packet to determine if a threshold has been reached;
    generating a third data packed associated with the first instrument;
    generating a fourth data packet associated with the second instrument;
    assigning an updated first priority to the third data packet in response to the threshold being reached;
    assigning an updated second priority to the fourth data packet in response to the threshold being reached;
    assembling a second sequence of data packets based on the updated first priority and the updated second priority; and
    sequentially transmitting the second sequence of data packets to the first network sub.

2. The method of claim 1, wherein the first priority is higher than the second priority, and wherein data packets associated with the first instrument are acquired more often than data packets associated with the second instrument.

3. The method of claim 1, wherein the priority of a data packet is assigned based upon which instrument generated the data packet.

4. The method of claim 1, wherein the priority is changed at the point of creation by activating instruments.

5. The method of claim 1, wherein the priority is changed at the point of creation by deactivating instruments.

6. The method of claim 1, wherein the priority is changed remotely.

7. The method of claim 1, wherein the priority is changed by a human user.

8. The method of claim 1, where in the priority is changed by the downhole instrument.

9. The method of claim 1, where in the priority is changed by a downhole processing unit.

10. The method of claim 1, wherein the priority is determined by a preamble before the data packet.

11. The method of claim 1, wherein the priority is determined by a channel in which the data packet is sent.

12. The method of claim 1, wherein the priority is determined by the order in which the data packets are sent.

13. The method of claim 1, wherein the second priority is less than the first priority and wherein the second data packet is filtered out by a downhole processing unit.

14. The method of claim 1, wherein the second priority is less than the first priority and wherein the second data packet is stored within the tool downhole for later transmission.

15. The method of claim 1, wherein the second priority is less than the first priority, and wherein the second data packet is erased downhole.

16. The method of claim 1, wherein the third priority is less than the fourth priority, and wherein the third packet is filtered out by a downhole processing unit.

17. The method of claim 1, wherein the first priority and the second priority are the same.

18. The method of claim 1, wherein the first priority, the second priority, the updated first priority, and the updated second priority are each different.

19. The method of claim 1, wherein all data packets are either low priority or high priority.

20. The method of claim 1, wherein the priority of a data packet is changed in real time or near real time.

* * * * *